United States Patent
Doherty et al.

(10) Patent No.: US 11,004,283 B1
(45) Date of Patent: May 11, 2021

(54) TEMPERATURE DETECTION DEVICE

(71) Applicant: keee, LLC, Clayton, MO (US)

(72) Inventors: Patrick Doherty, Town and Country, MO (US); John Wall, Shiloh, IL (US); Michael S. Biviano, St. Louis, MO (US); Steven W. Murray, Roselle, IL (US); Jeremy Morgan Murray, Roselle, IL (US); Brian A. Frank, David, IL (US); Joseph A. Turek, Downers Grove, IL (US)

(73) Assignee: KEEE, LLC, Clayton, MO (US)

( * ) Notice: Subject to any disclaimer, the term of this patent is extended or adjusted under 35 U.S.C. 154(b) by 0 days.

(21) Appl. No.: 16/945,472

(22) Filed: Jul. 31, 2020

(51) Int. Cl.
*G01K 13/00* (2021.01)
*G07C 9/00* (2020.01)
*G07C 9/37* (2020.01)
*G01J 5/10* (2006.01)
*G01J 5/00* (2006.01)

(52) U.S. Cl.
CPC ........ *G07C 9/00563* (2013.01); *G01J 5/0025* (2013.01); *G01J 5/10* (2013.01); *G07C 9/00944* (2013.01); *G07C 9/37* (2020.01); *G07C 2009/00507* (2013.01); *G07C 2009/00587* (2013.01); *G07C 2209/63* (2013.01)

(58) Field of Classification Search
CPC ....... A61B 5/01; A61B 5/4064; A61B 5/7425; A61B 5/6898; A61B 5/008; A61B 5/1172; A61B 2562/0247; A61B 2562/08; A61B 2562/0271; A61B 2090/065; A61B 2503/12; G07C 9/00563; G07C 9/37; G07C 9/00944; G07C 2009/00587; G07C 2209/63; G07C 2009/00507; G01J 5/0025; G01J 5/10
See application file for complete search history.

(56) References Cited

U.S. PATENT DOCUMENTS

| | | | |
|---|---|---|---|
| 2010/0033303 A1* | 2/2010 | Dugan | A63F 13/71 340/5.82 |
| 2016/0116348 A1 | 4/2016 | Lee et al. | |
| 2016/0262629 A1* | 9/2016 | Abreu | A61B 5/01 |
| 2019/0027113 A1* | 1/2019 | Kaine | G09G 5/005 |

(Continued)

OTHER PUBLICATIONS

CMU—Queen, Scott, "CMU Changes Safeguard Student Health", https://news.centralmethodist.edu/2020/08/changes-to-safeguard-student-health.html, Aug. 9, 2020, 3 pages.

(Continued)

*Primary Examiner* — An T Nguyen
(74) *Attorney, Agent, or Firm* — Dorsey & Whitney, LLP

(57) ABSTRACT

Described herein is a temperature device, including systems and methods associated therewith. The temperature device may include a housing. The temperature device may further include an actuation feature associated with the housing and configured to receive a user input. The temperature device may further include a sensing feature recessed within the housing and configured to detect a temperature condition in response to a receipt of the user input. The temperature device may further include a communication module operatively connected to the sensing feature and configured to transmit and receive information associated with a detection of the temperature condition.

8 Claims, 8 Drawing Sheets

(56) References Cited

U.S. PATENT DOCUMENTS

2019/0323895 A1* 10/2019 Kostopoulos ......... G01J 5/0025

OTHER PUBLICATIONS

NYT—McNeil, Donald Jr., "Can Smart Thermometers Track the Spread of the Coronavirus?", https://www.nytimes.com/2020/03/18/health/coronavirus-fever-thermometers.html, Mar. 18, 2020, 3 pages.
Youtube, "Presage PreCheck—Channel", https://www.youtube.com/channel/UCYcYwB8f4UE55DZdtPXk9Q/videos, Sep. 2020.

* cited by examiner

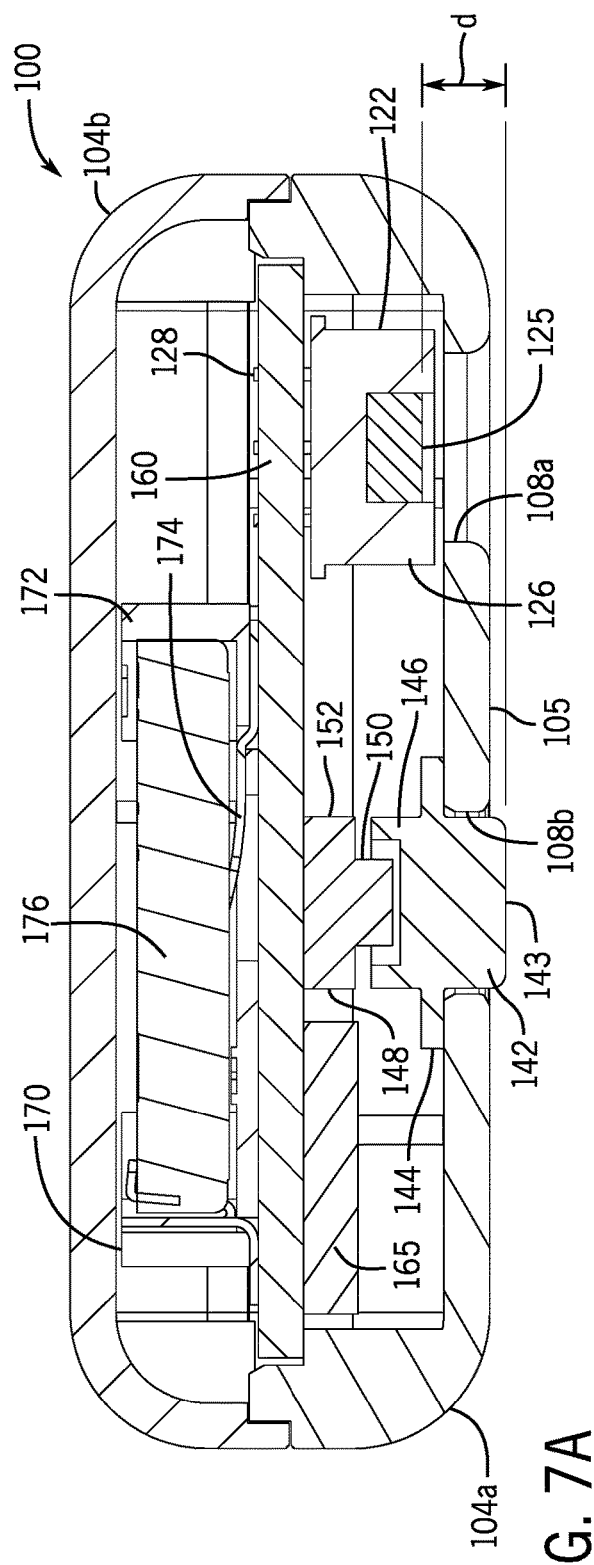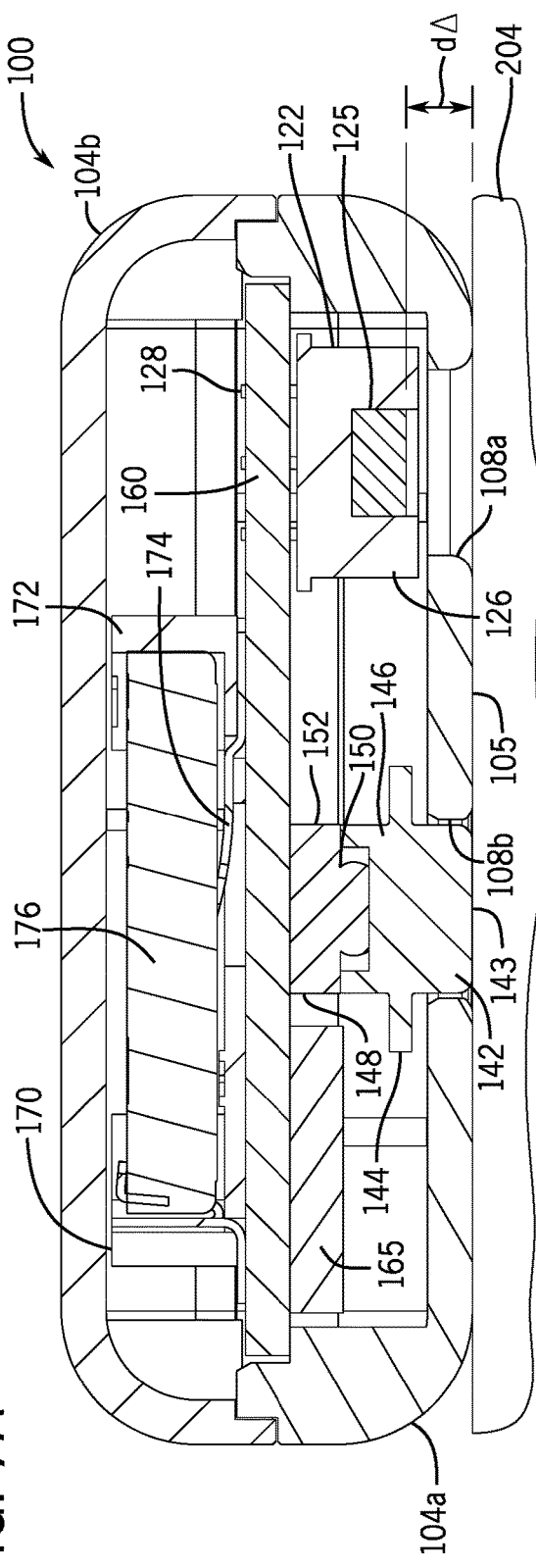

ns, and
more particularly to thermometers that may be coupled to
one or more computing devices.

BACKGROUND

Many buildings, campuses, floors, and the like, have
security measures, such as on-duty guards, locked doors,
gates, and the like, that help to limit and control the people
that enter and/or exit the particular area. For example, many
office buildings include gates, elevators, or turnstiles that
require an access object, such as a key fob or radio frequency
identification element, to open or activate. These types of
measures help to prevent unauthorized persons from accessing select areas. However, many of these security measures
and checkpoints are positioned within a building or other
area, such as a reception area of an office floor. As such,
these types of security measures may be inadequate in
preventing contamination from persons carrying disease,
bacteria, toxic elements, or the like. For example, a person
having a disease, such as a viral infection, may interact with
many surfaces within a building and/or with people within
the building, before being denied access, putting people
within the building or area at risk. Current solutions, such as
on-site thermal detectors often require a close spatial range
in order to detect certain characteristics (e.g., fever) and thus
cannot screen access before contamination may occur.

Additionally, conventional thermal detectors are often
quite bulky and difficult to store or transport, which make
them inconvenient to use outside of select settings. Relatedly, many thermal detectors are not compatible with additional devices, such as smart phones, but rather are configured to operate as standalone products and not allow data
transfer between devices.

SUMMARY

In one example, a temperature device is disclosed. The
temperature device includes a housing having an exterior
surface. The temperature device further includes an actuation feature extending from the exterior surface and configured to receive a user input. The temperature device further
includes a sensing feature coupled to the exterior surface
adjacent the actuation feature and configured to detect a
temperature condition in response to a receipt of the user
input. The temperature device further includes a communication module operatively connected to the sensing feature
and configured to transmit and receive information associated with a detection of the temperature condition.

In another example, a system is disclosed. The system
includes a temperature device including a sensor configured
to detect a temperature condition. The system further
includes an authentication device configured to generate
user identification data. The system further includes a processing element in communication with the temperature
device and the authentication device. The processing element is configured to, in response to a detection of the
temperature condition, associate the temperature condition
with the user identification data generated by the authentication device.

In another example, a method is disclosed. The method
includes receiving a user input at an actuation feature of a
temperature device. The method further includes detecting a
temperature condition of a user using a contactless temperature sensor. The method further includes transmitting information associated with the temperature condition from the
temperature device to one or more devices of a network,
including an authentication device.

In addition to the exemplary aspects and embodiments
described above, further aspects and embodiments will
become apparent by reference to the drawings and by study
of the following description.

BRIEF DESCRIPTION OF THE DRAWINGS

FIG. 7A depicts a cross-sectional view of the temperature
device in a first configuration, taken along line 7A-7A of
FIG. 4.

FIG. 7B depicts a cross-sectional view of the temperature
device in a second configuration, taken along the line 7A-7A
of FIG. 4.

DETAILED DESCRIPTION

Figure 1:
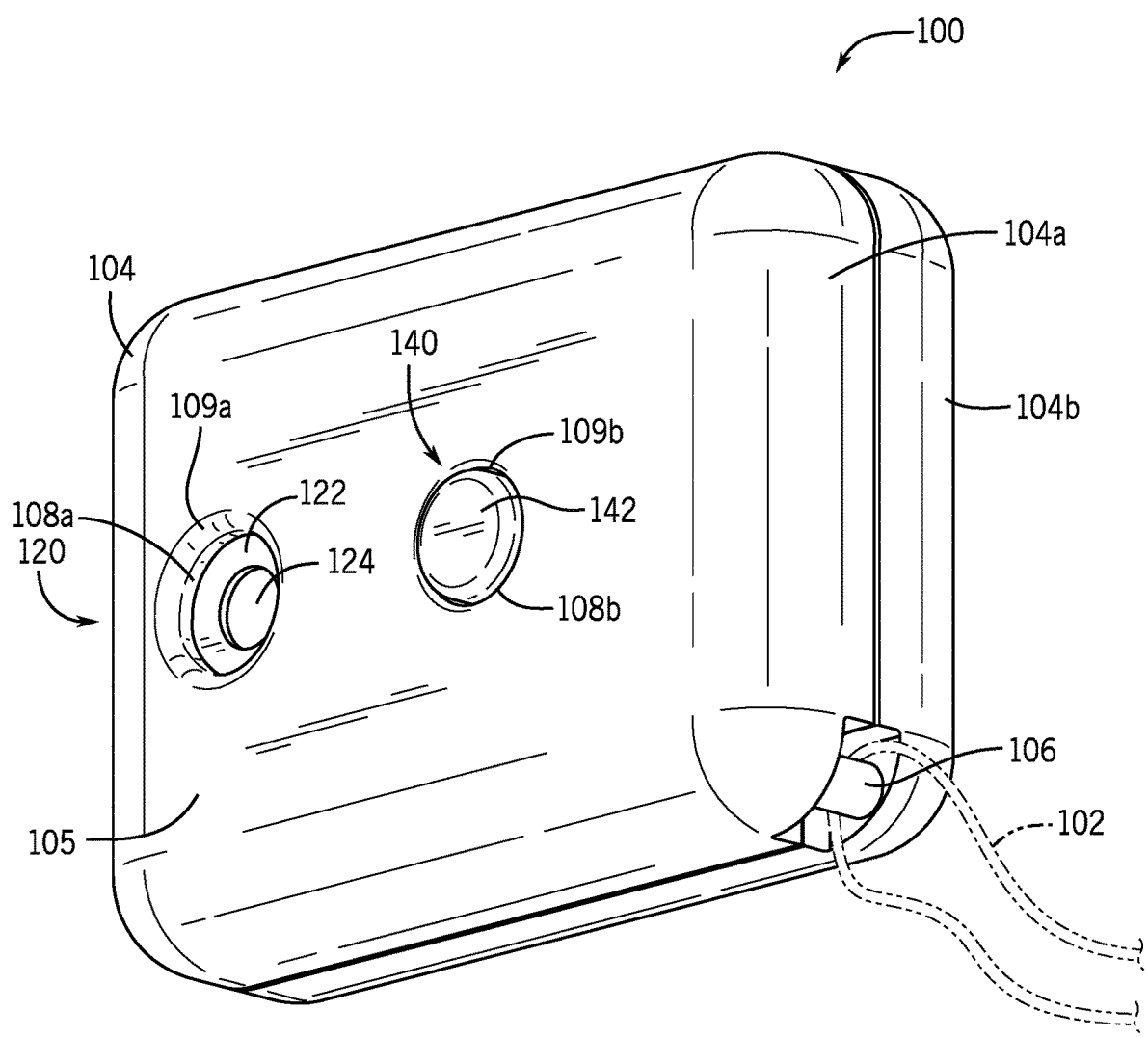
FIG. 1 depicts an isometric view of a temperature device.

The description that follows includes sample systems,
methods, and apparatuses that embody various elements of
the present disclosure. However, it should be understood that
the described disclosure may be practiced in a variety of
forms in addition to those described herein.

The present disclosure describes temperature devices,
associated systems, and methods of use thereof. A sample
temperature device may be adapted to detect a temperature
condition of a user and optionally determine that the temperature condition is indicative or associated with a febrile
condition, or at least provide an output that may be used by
the user or system to determine whether the temperature
condition exceeds a predetermined value, e.g., is a febrile
condition. The temperature device may be associated with
an authentication device adapted to generate user identification data, such as an image of the user detecting his or her
own temperature condition using the temperature device.
The information collected with the temperature device and
system can be used to grant or deny access to users to an
access-controlled area based in part on the determination of
the detected temperature condition and a verification that the
determined condition is a condition of the user, as may be
determined using the identification data.

To facilitate the foregoing, the temperature device may
have one or more sensors configured to send and/or receive
a signal, such as an infrared signal, or other signal that can
be associated with or used to determine a body temperature
of the user. The temperature device may also include a
processing element associated with the sensor and equipped to process the detected signal to determine the temperature condition exceeds a threshold valve, or may be configured to output a temperature reading in a particular format, e.g., degrees Fahrenheit or Celsius. The threshold value may be indicative of a febrile condition, and may be modified or programmed as need for a specific application. For example, the processing element may determine that the detected temperature condition is associated with a value that meets or exceeds a threshold value indicative of the febrile condition. Conversely, the processing element may be configured to determine that the detected value is less than the threshold value and that the user may not be exhibiting signs of a fever. As another example, the processing element may be configured to simply convert the detected data, e.g., infrared information, into a body temperature reading for the user.

The sensor may detect the temperature condition in response to a mechanical actuation or other input received at the temperature device. A mechanical button having a tactile feature and mechanical switch may be used. The button and the sensor may be coupled with a housing and arranged along a common exterior surface of the housing. In use, the button may be pressed against the user's forehead until the button is substantially flush with the housing exterior surface. In response to a press at the button, such as a continuous press or continuous force, the sensing feature may be activated to detect the temperature condition. In some cases, the sensor may be arranged within the housing such that when the button is depressed, the sensor is positioned at a selected spacing from the user's forehead. The selected spacing may be selected to optimize a contactless infrared temperature reading. For example, the spacing may be selected based on a distance from the skin that is calibrated to the most accurate reading for the particular sensor.

The temperature device may further include a communications chip or feature. For example, the temperature device may include a Bluetooth module, including certain Bluetooth ultra-low energy modules adapted for maximum flexibility in sending and receiving signals with a nearby device, including the authentication device, including directional information that may indicate a direction of the Bluetooth signal. The authentication device may include, for the sake of non-limiting example, mobile phones, remote fob devices, kiosks, or other devices that can generate a facial image of the user and/or adapted to generate a unique, user-identifying code. The communications feature may also be used to determine the relative position of the temperature device and the authentication device to one another.

The temperature device may be used in the context of a system for allowing access control based on detected characteristics, e.g., temperature, and user identification, where at least some of the characteristics are detectable before a user has access or is near an access-controlled area. One such system is described in U.S. patent application Ser. No. 16/925,066, entitled "TEMPERATURE BASED ACCESS CONTROL," the entirety of the disclosure of which is incorporated by reference herein. The system may operate to both detect a temperature condition and associate the temperature condition with a known user, as well as a detected time and location. This may help mitigate unauthorized access to an access-controlled area. To illustrate, the temperature device may detect a temperature condition and determine that the temperature condition qualifies a user for entry to an access-controlled area, such as being a temperature condition that is less than threshold value indicative of a febrile condition The authentication device may generate user identification data, such as an image of the user using the temperature device. The user identification data may be used with other information, such as a detected position of the temperature device and time of the temperature condition detection to verify that the temperature condition is a temperature condition of the user whom otherwise is permitted access to access-controlled area.

With reference to the figures, FIG. 1 depicts an isometric view of a temperature device 100, such as the temperature device discussed above and described in greater detail below. The temperature device 100 is configured to detect a temperature condition of a user. The temperature device 100 is further configured to transmit information associated with the detection of the temperature condition to an authentication device, or other device over a network.

The temperature device 100 includes a housing 104. The housing 104 may enclose various sensors, switch, communications features, and so on, that facilitate the functionality of the temperature device. In the example of FIG. 1, the housing 104 include a first housing portion 104a and a second housing portion 104b. The first and second housing portions 104a, 104b may cooperate to form a protective shell around internal components of the temperature device 100 and in this manner may define a cavity in which the internal components are received. The two-piece construction of the housing 104 may also facilitate manufacturing by allowing the internal components to be fully or substantially fully assembled before enclosure of the internal components in the housing 104. The temperature device 100 may be relatively small, such as being the size of a standard car key fob. Sample dimensions, for the sake of non-limiting example, include a 0.5 inch by 1.0 inch length and width dimensions, 0.75 inch by 1.5 inch length and width dimensions, and so on. In other cases, the temperature device 100 may be larger or smaller and/or have different proportionality to the length and width dimensions, including being substantially square-shaped. In addition to the various functional considerations, the shape and appearance of the housing 104 may be selected to have an aesthetically pleasing appearance.

The first and second housing portions 104a, 104b may also cooperate to define an attachment feature 106. The attachment feature 106 may be defined at a recessed corner of the housing 104 in which a bar or other fastening element extends over the recess. For example and with reference to FIG. 2, the first housing portion 104a may define a first attachment feature section 106a, and the second housing portion 104b may define a second attachment feature section 106b. In an assembled configuration, the second attachment feature section 106b may be received by the first attachment feature section 106a in order to define the bar or other fastening element of the attachment feature 106. The attachment feature 106 may be used to receive an optional lanyard 102 (shown in phantom) to facilitate retention of the temperature device 100 with a user, such as with a user's keychain, wristband, and so on. It will be appreciated that the lanyard 102 is shown for purposes of illustration. In other examples, the attachment feature 106 may be used to attach the temperature device 100 to a key ring, bracelet, identification badge, and so on.

Figure 2:
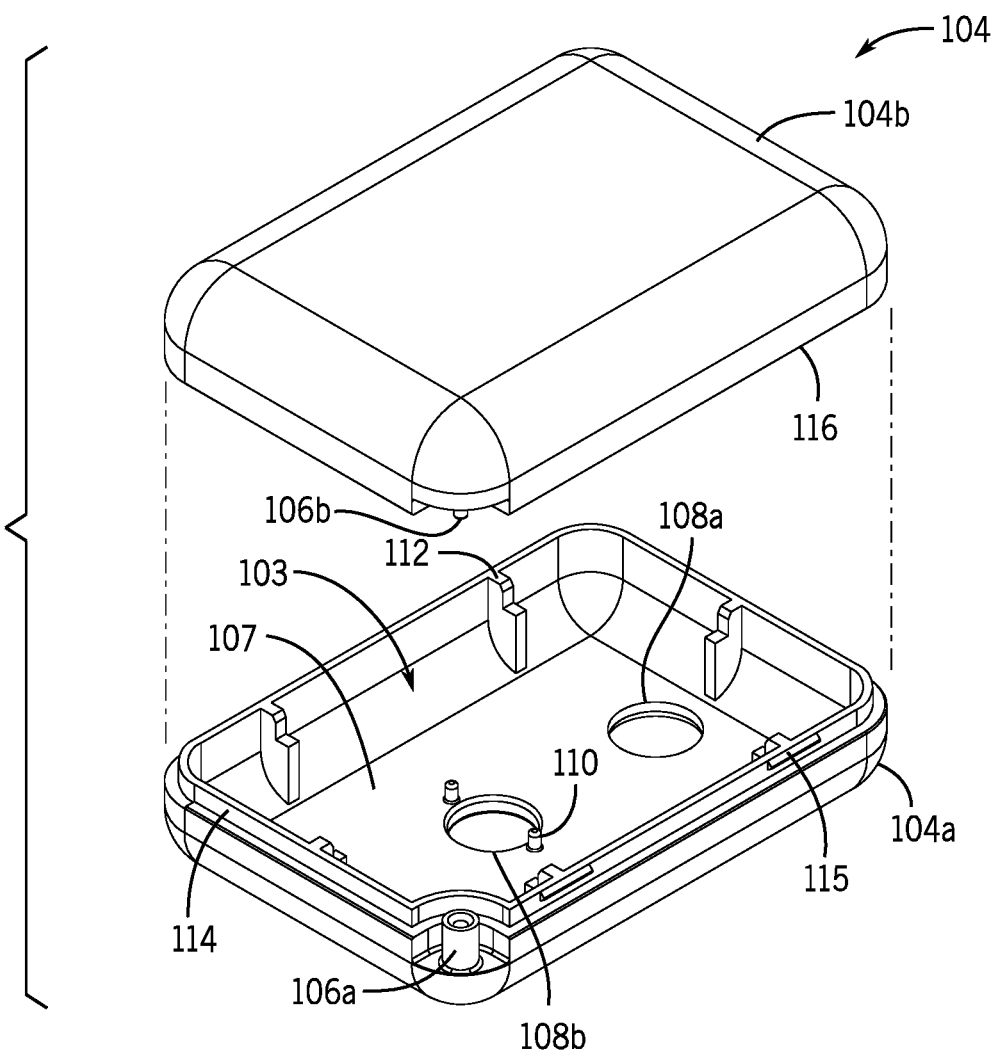
FIG. 2 depicts an exploded view of a housing of the
temperature device of FIG. 1.
Figure 4:
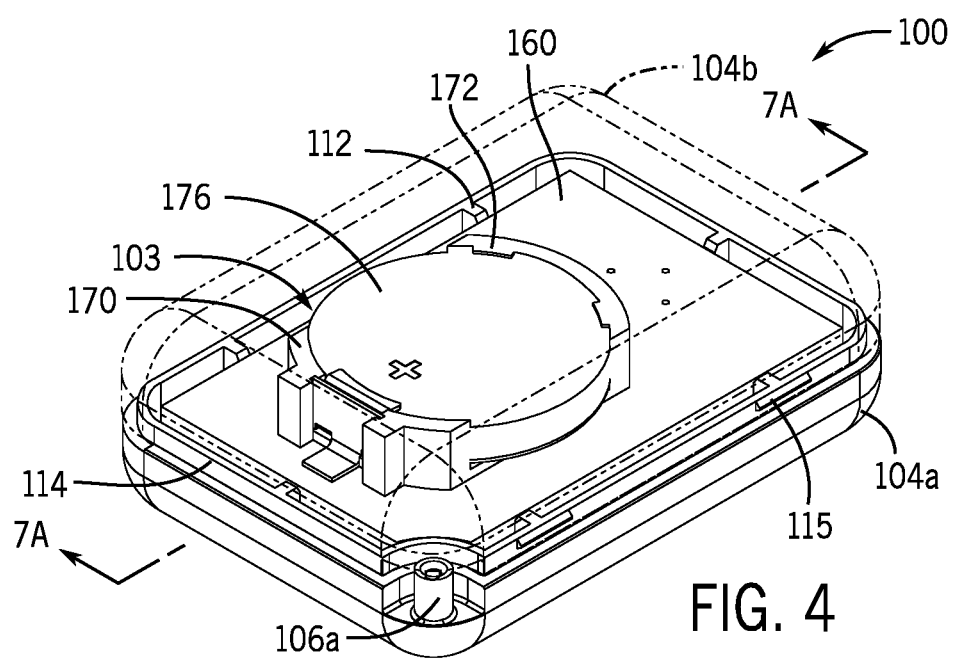
FIG. 4 depicts an assembled view of the temperature
device of FIG. 1.

The first and second housing portions 104a, 104b cooperate to define an inner volume 103 of the housing 104, as shown in FIG. 2. The first housing portion 104a defines the first hole 108a and the second hole 108b. The first housing portion 104a may include pins 110 and shelves 112. The pins 110 may include one, two or more rod-like structures that are arranged about the second hole 108b. The pins 110 may be used to secure one or more internal components of the temperature device 100, such as a button, switch, sensor and/or other component. The shelves 112 may include grooves, notches, pedestals, and the like that define a seat for various internal components of the temperature device 100, such as a printed circuit board or PCB 160 (FIG. 4). The shelves 112 may collectively define a footprint or outline or boundary that is substantially analogous to the footprint of the PCB 160. This may allow the shelves 112 to define a snap-fit connection with the PCB 160. Additionally or alternatively, fasteners, including screws, may be used to secure the PCB 160 to the shelves 112. In the present example, six shelves are shown; however, more or fewer may be used.

The first and second housing portions 104a, 104b may be constructed to removably attach to one another. For example and with continued reference to FIG. 2, the first and second housing portions 104a, 104b may be attached to one another in order to substantially enclose the inner volume 103 and internal components housed therein. The first and second housing portions 104a, 104b may be manipulated in order to facilitate release from one another and expose the inner volume 103 to the external environment. This may allow for repair and maintenance of the inner components of the temperature device 100, including the replacement of a battery 176 as needed.

To facilitate the removable attachment, the first housing portion 104a may include a lip 114 and the second housing portion 104b may include an engagement edge 116. The engagement edge 116 may be slid over the lip 114 such that the first housing portion 104a is received by the second housing portion 104b to substantially enclose the inner volume 103. Engagement features 115 are shown positioned about the lip 114. The engagement features 115 may include or be defined by a resilient member that contacts the engagement edge 116 and flexes into a position substantially within the second housing portion 104b. The engagement features 115 may catch an inside groove or other feature defined within the second housing portion 104b. To facilitate release, one or more of the engagement features 115 may be manipulated away from the second housing portion 104b, such as by a twisting movement between the first and second housing portions 104a, 104b, a release hole providing access to the engagement features 115, or other feature. In some cases, the engagement features 115 may be omitted, and the lip 114 and engagement edge 116 adapted to define a snap fit that sufficiently secures the first and second housing portions 104a, 140b to one another during use.

The first housing portion 104a may define a contact surface 105 generally adapted to be raised to and pressed against the forehead of a user or other area of the user where the temperature is to be detected. The contact surface 105 may have a first hole 108a, which may be a sensor aperture, and a second hole 108b, which may be an actuator or button aperture, with each of the first and second holes 108a, 108b extending through the first housing portion 104a and into the interior of the housing 104. The first and second holes 108a, 108b may be arranged on a common side of the temperature device 100, such as a side configured to contact with a user forehead. In some cases, the first and second holes 108a, 108b may be aligned with one another on the contact surface 105. A first curved edge 109a may extend substantially around the first hole 108a. A second curved edge 109b may extend substantially around the second hole 108b. The first housing portion 104a may also include a housing inner surface 107 (shown in phantom) adapted to receive the internal component of the temperature device 100. The housing inner surface 107 extends to and at least partially defines the first and second holes 108a, 108b.

The temperature device 100 includes a sensing feature 120 and an actuation feature 140. Broadly, the sensing feature 120 may include one or more components, assemblies or subassemblies adapted to detect a temperature condition of a user. The actuation feature 140 may include one or more components, assemblies or subassemblies adapted to cause the sensing feature 120 to detect the temperature condition upon the receipt of a user input. The housing 104 may be configured to fully enclose internal components of the temperature device, absent the actuation feature and the sensing feature.

Figure 3:
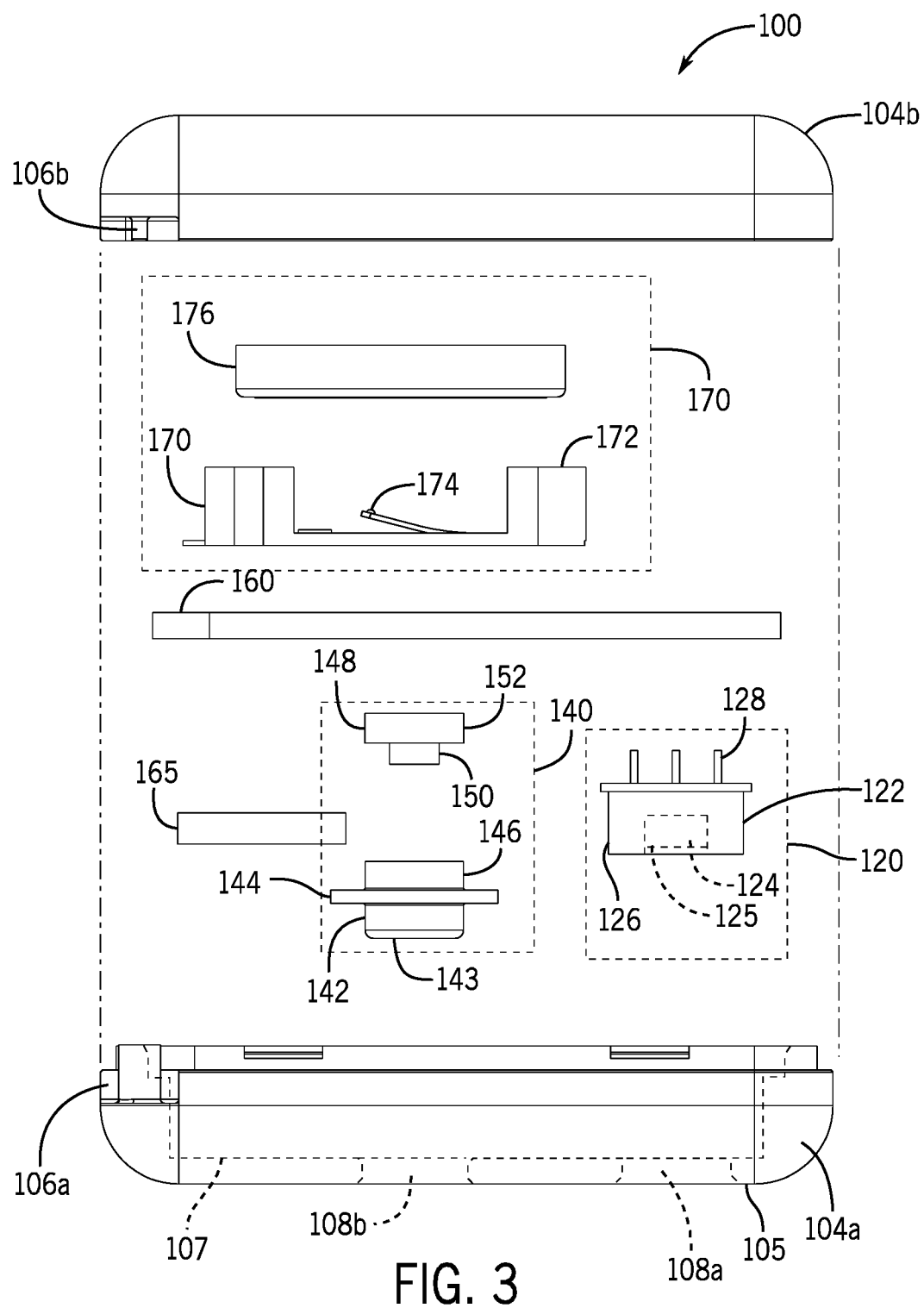
FIG. 3 depicts an exploded view of the temperature device
of FIG. 1.

With reference to the exploded view of FIG. 3, the sensing feature 120 is shown as including the sensor 122 and the optical region 124. The optical region 124 may be held within a sensor housing 126 and define a face 125. The face 125 may be adapted to receive a signal, such as an infrared signal, or other signal associated with a body temperature of a user. The sensor 122 may further include connecting feature 128. The connecting feature 128 may define a base or structure component of the sensor 122 for the sensor housing 126 and the optical region 124. The connecting feature 128 may also define a mechanical and electrical connection to the PCB 160. For example, the connecting feature 128 may receive one or more signals from the PCB 160 that cause the sensor 122 to detect a temperature condition and/or provide electrical power to the sensor 122. Further, the connecting feature 128 may be used to communicate one or more signals to the PCB 160 that are indicative of a temperature condition detected by the sensor 122, e.g., via the optical region 124.

The sensing feature 120 may be coupled with the housing 104 and arranged at the first hole 108a. The sensor 122 may be positioned as substantially aligned with in the first hole 108a. For example, the optical region 124 of the sensor 122 may be aligned with the first hole 108a so that the optical region 124 may send and/or receive a signal, including an infrared signal, through the first hole 108a. The sensor 122 may be substantially aligned with the first hole 108a and recessed within the housing 104. For example, the sensor 122 may be arranged with the sensor housing 126 seated on and/or above or separated from the housing inner surface 107, with the sensor housing 126 generally having a larger cross-sectional dimension than a cross-sectional dimension of the first hole 108a. In this assembled configuration, the face 125 of the optical region 124 may in turn be recessed or set back from the contact surface 105. The setback of the face 125 from the contact surface 105 may be tuned to optimize a signal or other reading while detecting a temperature condition, as shown in greater detail in FIG. 7B. As explained herein, a user may press their forehead substantially flush with the contact surface 105 during use of the device. The setback of the face 125 from the contact surface 105 may define a selected spacing from the face 125 from a user's forehead in this configuration.

The sensing feature 120 may include a contactless temperature sensor. The contactless temperature sensor may send and/or receive infrared signals and generate a signal indicate of a body temperature of the user using the received infrared signals. It will be appreciated, however, that other sensing devices may be used without departing from the scope and spirit of the invention. For example, thermocouples, resistance temperature detectors, thermistors, and semiconductor based integrated circuits, among other options, may also be implemented with the temperature device 100 in order to facilitate a detection of the temperature condition.

The sensing feature 120 may detect a temperature condition in response to a signal caused by an actuation of the actuation feature 140. The actuation feature 140 is shown in FIG. 3 as including a button 142, a button surface 143, a lip 144, a connecting structure 146, a switch 148, a tactile feature 150, and a make feature 152. The button 142 may be a mechanical button adapted to receive a press from a user's forehead or other user input at the button surface 143. The button 142 may be coupled with the housing 104 and arranged at the second hole 108b. The button 142 may be positioned substantially in the second hole 108b with the button 142 protruding from the housing 104, such as protruding from the first housing portion 104a. As such, the button surface 143 may be positioned proud from the contact surface 105 when the button 142 is an unactuated state. In an actuated state, the button surface 143 may be depressed into a position in which the button surface 143 is substantially flush with the contact surface 105.

The lip 144 may be positioned inward of the button surface 143 and extend circumferentially around the button surface 143. The lip 144 may define a retaining structure that may be adapted to hold or otherwise prevent exit of the button 142 from the housing 104. For example, the button 142 may be generally biased out or protruding from the second hole 108b, and the lip 144 may be adapted to contact the housing inner surface 107. The button 142 may be coupled to the switch 148 via the connecting structure 146. The connecting structure 146 may include a recess, indent, landing or other feature that allows the button 142 to be seated on the switch 148.

The switch 148 may include a mechanical or other contact based switch. In the example of FIG. 3, the switch 148 includes the tactile feature 150 and the make feature 152 or switch. When depressed, the button 142 may contact the tactile feature 150 and cause the tactile feature 150 to contact the make feature 152. The contact of the tactile feature 150 and the make feature 152 may complete a circuit or otherwise cause the PCB 160 to generate a signal that allows the sensing feature 120 to detect the temperature condition. The tactile feature 150 may be a tactile dome or other feature that generate a tactile sensation, including a clicking, a pop, and/or a mechanical resistance upon being depressed. The tactile feature 150 may indicate to the user when the actuation feature 140 is actuated. In other cases, the tactile feature 150 may be omitted. While a contact-type switch is show with respect to FIG. 3, it will be appreciated that other switches may be used. For example, the switch 148 may sense the depression of the button 142 using an optical, capacitive, and/or resistive sensor, among of the possibilities.

The actuation feature 140 and the sensing feature 120 may each be connected to the PCB 160. The PCB 160 may include one or more processing elements, computer processors or microcontrollers that are configured to perform operations in response to computer-readable instructions. The PCB 160 may include a central processing unit of the temperature device 100. Additionally or alternatively, other processing elements may be incorporated within the temperature device 100, including application specific integrated chips (ASIC) and other microcontroller devices. In some cases, the PCB may also include a memory component, including a variety of types of non-transitory computer-readable storage media, including, for example, read access memory (RAM), read-only memory (ROM), erasable programmable memory (e.g., EPROM and EEPROM), or flash memory. The memory may therefore be configured to store computer-readable instructions, sensor values, and other persistent software elements. The processing elements or other like components of the PCB 160 may be operable to read computer-readable instructions stored on the memory and/or computer-readable media. The computer-readable instructions may adapt the processing elements to perform the operations or functions described above. The computer-readable instructions may be provided as a computer-program product, software application, or the like.

The PCB 160 is shown in FIG. 3 connected to a communications module 165. The communications module 165 may be a Bluetooth chip or similar device that operates to send and receive signals. In the example of FIG. 3, the communications module 165 may be an ultra-low power Bluetooth Low Energy (BLE) module. For example, the communications module 165 may include BLE modules BM833A/AF, BM833F/E, as produced by Fanstel Corporation of Scottsdale Ariz. In various implementations, the communications module 165 may emit directional information, as well as other data, which allows the receiving device (e.g., user's smart phone) to not only receive the data, but also determine a direction of the emitting device, which may be the temperature device 100. In other cases, other Bluetooth modules may be used. Additionally or alternatively, the communications module 165 may employ other or additional techniques to facilitate sending and receiving signals such as, but not limited to, radio transmissions, Ethernet, Wi-Fi, local area network, ZigBee, wide area network, and so on.

The communications module 165 may be adapted to facilitate entry into an access-controlled area. An access-controlled area may be an area that limits access to only those users possessing a certain credential. For example, a workplace may be an access-controlled area. An employee may be a user having the credential, for example, such as that for being permitted to enter the access-controlled area in light of employment at the workplace. The communications module 165 may be used to generate one or more codes that are indicative of the credential or that otherwise provide an indication of the user being allowed entry into the access-controlled area. To illustrate, the communications module 165 may be used to generate a radio frequency identification (RFID) tag or other signal that is indicative of the credential. The RFID tag may be received and processed by a receiver or other device associated with the workplace, whereat the signal may be processed in a manner that causes the user to gain access to the access-controlled area, such as resulting in an unlocked door. Additionally or alternatively, the communications module 165 may generate a signal indicative of the credential that is received by the authentication device, such a mobile phone of the user, and/or other device, including a device which permits the user to read a code at a display. In some cases, the communications module 165 may also be used to send and/or receive signals associated with the credential from a cloud-based system or other remote system. In light of the foregoing, the temperature device 100 may be used to permit access of the user to the access-controlled area, allowing the user to access the access-controlled area without a separate badge, ID, key, or other form of credential and access.

The communications module 165 may also be adapted to send and receive signals associated with a temperature condition. As one example, the sensing feature 120 may be detect a temperate condition upon receipt of a user input at the actuation feature 140. One or more processing elements of the PCB 160 may be used to determine that the temperature condition meets or exceeds a threshold value that is indicative or otherwise associated with a febrile condition. The communications module 165 may be communicatively associated with the processing elements, via the PCB 160, and be configured to send a signal to another device that is associated with the temperature condition, including a signal associated with the temperature condition. For example and as described herein, the communications module 165 may be configured to send a signal to an authentication device or other device of a network, including distributed and non-distributed networks. The communications module 165 may further be configured to receive a signal from the authentication device or other device. In this regard, the communications module 165 may also be used to determine a position of the temperature device 100 relative to another device. In this present example, the communications module 165 may be used in conjunction with one or more processing elements, antennas, and so on of the authentication device to determine a relative distance and orientation (e.g., a vector having a magnitude corresponding to the distance and an angle corresponding to the orientation) between the authentication device and the temperature device 100, as shown and described below with reference to FIGS. 5 and 6.

The temperature device 100 may also generally include an onboard power source in order to provide power to the communications module 165, the sensing feature 120, the actuation feature 140 and/or other components of the temperature device 100. In the example of FIG. 3, a power source 170 is shown, including a battery holder 172, a contact 174, and a battery 176. The battery 176 may be seated within the battery holder 172 and engaged with the contact 174. The battery holder 172 may be mounted to and electrically connected with the PCB 160, allowing for the delivery of electrical power from the battery 176 to the various components of the temperature device 100. It will be appreciated that the battery 176 is shown in FIG. 3 for purposes of illustration. Additionally or alternatively, other mechanisms may be used to deliver electrical power to the components of the temperature device 100. As one illustration, the battery 176 may be a rechargeable battery, and the temperature device 100 may employ solar and/or inductive charging capabilities in order to recharge the battery 176. In other cases, the temperature device 100 may have a port to facilitate delivery of electrical power via a hardwired connection to the PCB 160 from an external power source.

Figure 5:
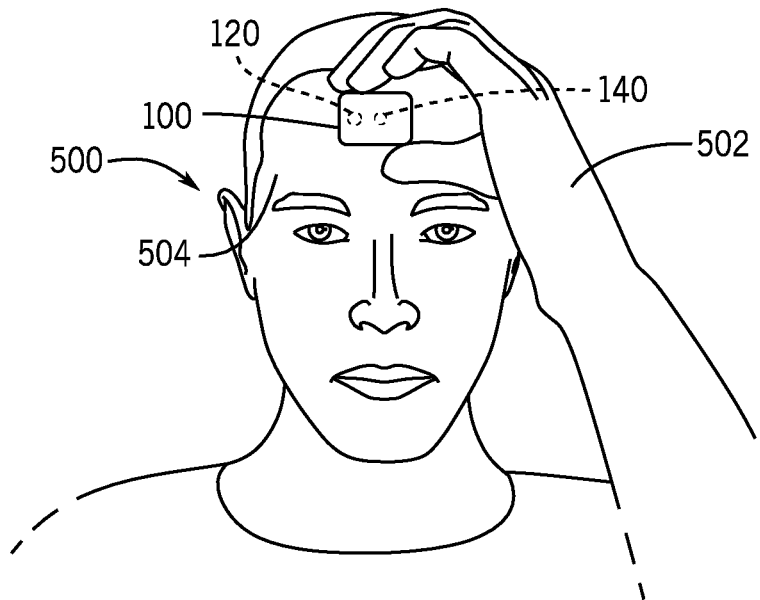
FIG. 5 depicts an example use of the temperature device
of FIG. 1 by a user.

FIG. 5 depicts an example use of the temperature device 100. In operation, a user 500 may raise the temperature device 100 to a forehead 504 of the user 500. For example, the user 500 may hold the temperature device 100 in a hand 502 of the user 500 and raise the temperature device 100 to the forehead 504. Once arranged at or adjacent the forehead 504, and as shown in greater detail below with respect to FIGS. 7A and 7B, the user 500 may press the temperature device 100 against the forehead 504 in order to actuate the actuation feature 140. The actuation of the actuation feature 140 may cause the sensing feature 120 to initiate one or more processes in order to detect a temperature condition of the user 500, e.g., via an infrared reading of the forehead 504, or the like. It should be noted that the temperature device 100 may be configured to be actuated on other locations of the user.

Figure 6:
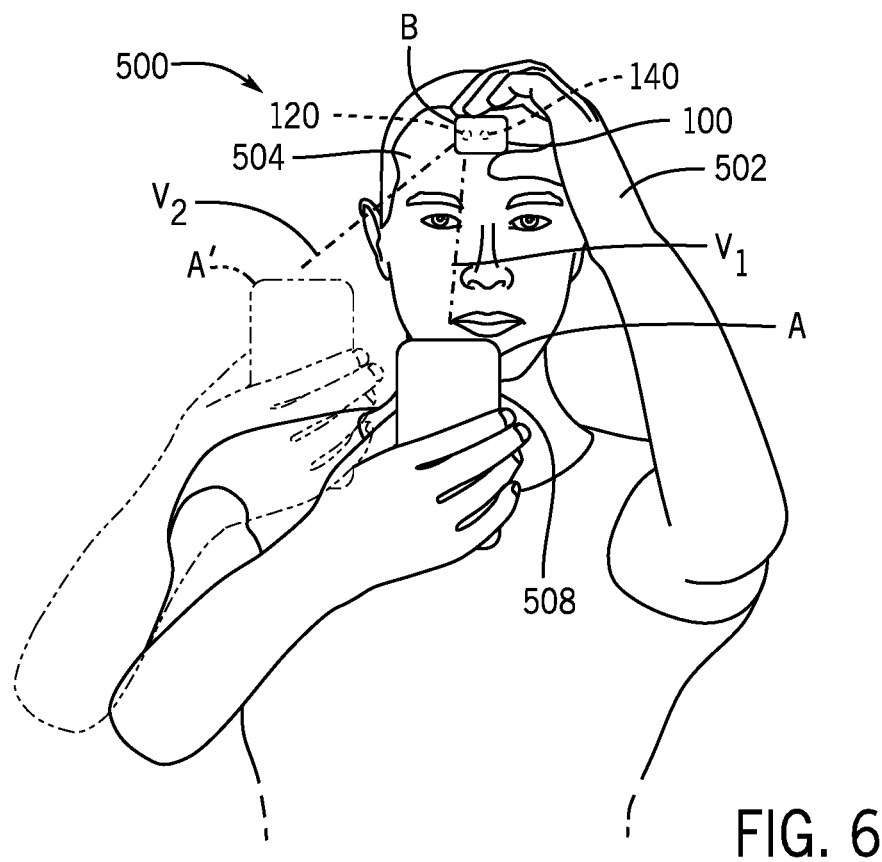
FIG. 6 depicts the user of FIG. 5 associating the temperature device with an authentication device.

FIG. 6 depicts the user 500 associating the temperature device 100 with an authentication device 508. As explained herein, the temperature device 100 may be used in the context of a system that verifies the identify of a user associated with a detected temperature condition. The authentication device 508 may be used to generate user identification data that is analyzed with the detected temperature condition of the temperature device 100 to verify the identity of the user 500 and associate the detected temperature condition as a verified temperature condition of the user 500.

In the example of FIG. 6, the authentication device 508 is shown as a mobile phone. The mobile phone may be configured capture one or more facial images of the user 500, such as a first facial image at a position A and a second facial image at a position A'. The facial images may be captured during use of the temperature device 100 by the user 500, for example, such as during a detection of a temperature condition. The captured facial images may be used to generate the user identification data. The authentication device 508 may be used to determine one or more of a time of the captured image, a position of the authentication device 508, and/or a position of the temperature device 100 during the use of the temperature device 100. In this manner, a processing element may be employed to determine a first vector $v_1$ corresponding to a relative position between the authentication device 508 during a capture of a first facial image and a position B of the temperature device 100. Further, the processing element may determine a second vector $v_2$ corresponding to a relative position between the authentication device 508 during a capture of a second facial image and the position B of the temperature device 100. Depth information, as one example, may be derived from the first and second vectors $v_1$, $v_2$ in order to determine the veracity of the images as being of the user 500 (e.g., as opposed to the images being of a flat photograph). The time of the images, as well as the image itself (e.g., via a comparison to a stored facial mesh) may also be used to determine the veracity of the images.

FIGS. 7A and 7B show cross-sectional views of the temperature device 100 taken along line 7A-7A of FIG. 4. With reference to FIG. 7A, the temperature device 100 is shown in an unactuated configuration. In the unactuated configuration a distance d may be defined between the button surface 143 and the face 125 of the sensor 122.

During use, the temperature device 100 may be pressed against a forehead of a user. The temperature device 100 may be pressed against the forehead of the user continuously during the detection of the temperature condition. When the temperature device 100 is released from the forehead, the detection of the temperature condition may cease.

With reference to FIG. 7B, the temperature device 100 is shown during use or otherwise being in actuated configuration. In FIG. 7B, the button surface 143 is shown in contact with the forehead 204. This contact may cause the button 142 to be depressed into the housing 104. The button 142 may be depressed into the housing 104 such that the button surface 143 is substantially flush with the contact surface 105. In the depressed or actuation configuration of FIG. 7B, the button 142 may contact and optionally deform the tactile feature 150. In turn, the tactile feature 150 may cause the make feature 152 to generate a signal indicative of a receipt of a user input at the actuation feature 140.

The actuation of the actuation feature 140 may cause the sensing feature 120 to detect the temperature condition. As show in FIG. 7B, a distance $d_A$ is defined between the button surface 143 and the face 125 of the sensor 122. The distance $d_A$ may be a distance in which the button face is substantially flush with the contact surface 105. The distance $d_A$ may therefore be used as a proxy for a distance between the face 125 of the sensor 122 and the forehead 204. Certain contactless temperature sensors may be optimized by positioning the sensor at a selected spacing from a user. For example, an infrared temperature sensor may have an optimized accuracy when position several millimeters from the a user. In this regard, the sensor 122 may be arranged within the housing 104 so that when the button surface 143 is fully depressed, the distance $d_A$ is approximately the selected spacing needed to optimize the accuracy of the temperature reading by the sensor 122.

Figure 8:
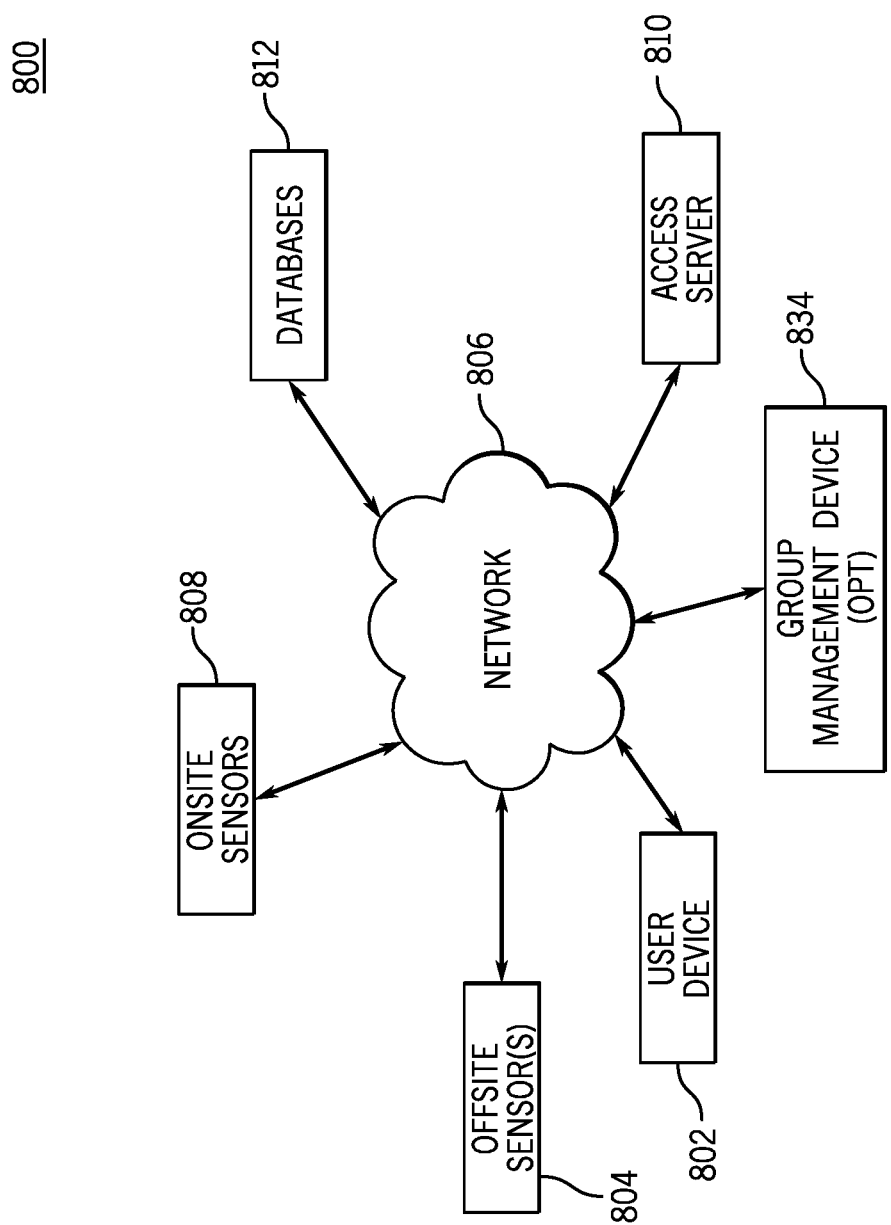
FIG. 8 depicts a simplified diagram of a system for
providing offsite sensor data using the example temperature
device.

FIG. 8 illustrates an example of an access system 800. The system 800 may include one or more user devices 802 that interact with the system 800 via a network 806. In many implementations, the system 800 may include multiple user devices 802, allowing individual people to interact separately with the system 800 via separate user devices 802. The user device 802 is any type of computing device that may transmit and receive data from other computing devices, including the authentication device 208 described herein. For example, the user device 802 may be a smartphone, tablet computer, wearable device, laptop, and so on. The user device 802 may include an image sensor, such as a camera, that allows a user to capture image data. The user device 802 may be in electronic communication with one or more other devices of the system 800, either directly, or via a network 806.

The system 800 may also include one or more offsite or remote sensors 804. The offsite sensors 804 may be incorporated within the temperature device 100, such as being or including the sensing feature 120. The offsite sensors 804 may be positioned away from an access-controlled area when capturing data. In many instances, the offsite sensor 804 may be portable. The number and type of offsite sensors 804 are dependent on the types of characteristics desired to be tracked or monitored. In one example, an offsite sensor 804 is a temperature sensor (e.g., infrared or thermal temperature detectors) that may detect temperature characteristics from a person, such as the sensor 122 described herein. A temperature sensor may be any type of contact or non-contact temperature measuring device such as a thermistor, thermocouple, resistance temperature device, infrared sensor, bulb thermometer, or the like. The offsite sensor 804 may also include a camera or image sensor that may capture images, e.g., images of a user. It should be noted that the offsite sensors 804 may be standalone sensors (e.g., thermometer) or may be integrated in the user device 802 or other devices, including the temperature device 100. For example, in one embodiment, a first offsite sensor 804 is a standalone thermometer or thermometer device and a second offsite sensor 804 is a camera integrated into the user device 802. Additionally, the offsite sensors 804 may communicate directly with the network 806 and other elements of the system 800 or may communicate indirectly with the network 806 and other elements, e.g., via the user device 802. The user device 802 and/or offsite sensor 804 may include one or more identification or authentication elements, which may be dynamic or static, e.g., a random number generator assigned with a particular user, a serial number, or the like. Additionally, the offsite sensor 804 may also include one or more communication mechanisms that allow the offsite sensor 804 to communicate with the user device, network, such as the communications module 165.

The onsite or location sensors 808 may be similar to the offsite sensors 804, but generally may be located on or near the access-controlled area. In one example, the onsite sensors 808 may be installed within an area or perimeter 826 of the access-controlled area (e.g., security cameras), but in other examples, the onsite sensor 808 may be portable and movable between different access-controlled areas as needed. The onsite sensor 808 may be any type of sensor that may detect characteristics of users. In one example, the onsite sensor 808 is a camera that may capture image data, e.g., RGB and/or depth information, of persons within a particular range, such as persons entering an access control perimeter 826 or other area. The onsite sensors 808 may also be able to detect authentication information, such as identifiers (e.g., barcodes, Quick Response ("QR") codes, radio frequencies, etc.), and the like, that may be used in addition to or in place of the user detected information (e.g., facial information). The type, number, and location of the onsite sensors 808 may vary depending on the access-controlled area 828 characteristics (e.g., size, location, number of possible persons requesting access), desired characteristics and authentication information to be used by the system 800 and the like.

The access server 810 or access processor may receive information from the user device 802, the onsite sensors 808, and/or the offsite sensors 804 to determine whether a person may access an access-controlled area 828. For example, the access server 810 may both authenticate a person (e.g., determine if a person is an employee with clearance to access a particular area), as well as the person satisfies biometric characteristics (e.g., temperature below a threshold). In many embodiments, the access server 810 may verify biometric characteristics at a first point in time separate from an access determination and user authentication, or may perform a secondary user authentication at a second point in time or second location. For example the access server 810 may first receive biometric data and determine that a person has satisfied the biological requirements (e.g., is not temperature) to enter the access controlled area and then may detect the person attempting to enter the access controlled area and verify the person's identity and access level, to allow access. In some embodiments, the access server 810 may include one or more computing devices (e.g., servers, computers, etc.), that may be a single device or multiple devices operating over a network or other environment.

The system 800 may also include one or more databases 812 that may store information related or used by components of the system 800. For example, the databases 812 may include facial recognition databases that store reference images or reference data corresponding to different users (e.g., employees) that may be used to verify a user identity or authenticate a user. As another example, the databases 812 may include biometric data and history for a particular user or entity. The type, structure, and data stored within the various databases 812 may be varied depending on the types of characteristics detected, authentication methods and elements used and the like.

The network 806 transmits data between the various components of the system 800. The network 806 may include two or more communication methods (e.g., Bluetooth and Wi-Fi) to communicatively couple the system 800 elements. The network 806 may include wireless and wired transmission methods, such as, but not limited to, radio transmissions, Ethernet, Wi-Fi, local area network, ZigBee, wide area networks, and so on.

The system 800 may optionally include one or more group management devices 834. The group management device 834 is any type of computing device that may transmit and receive data from other computing devices. For example, the group management device 834 may be a smartphone, tablet computer, wearable device, laptop, and so on. The group management device 834 may include an image sensor, such as a camera, that allows a user to capture image data. The group management device 834 may be in electronic communication with one or more other devices of the system 800, either directly, or via a network 806. The group management device 834 may be used to manage user devices 802 that interact with the system 800. In various implementations, the group management device 834 may be configured to display user access data that may correspond, for example, to whether a user has satisfied access conditions for a particular area (e.g., temperature thresholds and/or identity confirmation), as well as whether a user has been screened for such access conditions. In this manner, a user of the group management device 834 may make real-time decisions regarding access based on system information.

Figure 9:
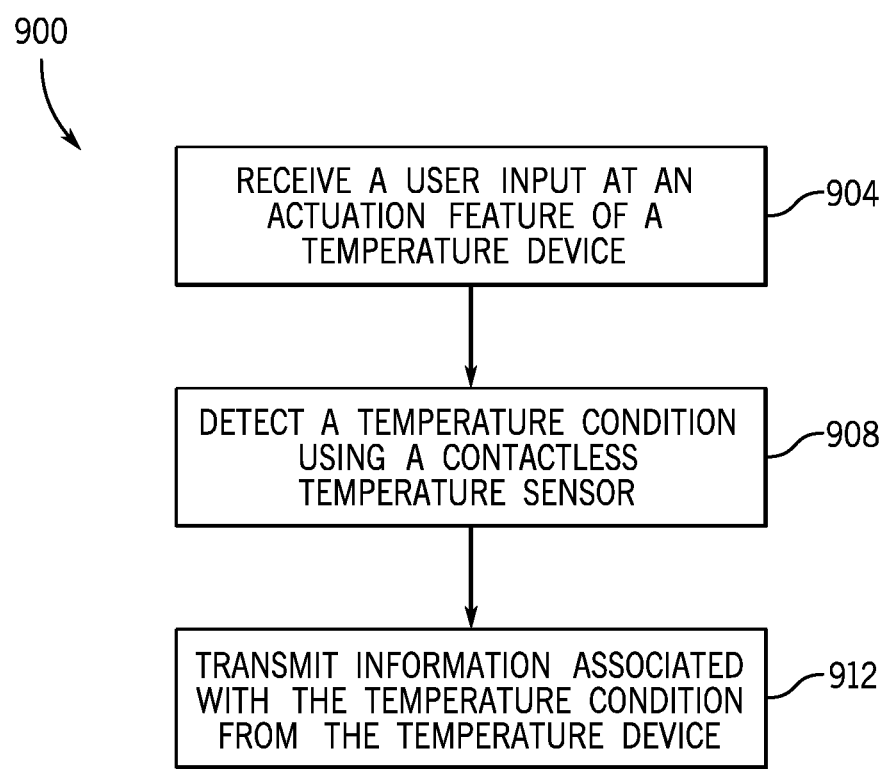
FIG. 9 depicts a flow diagram for detecting temperature
conditions.

To facilitate the reader's understanding of the various functionalities of the embodiments discussed herein, reference is now made to the flow diagram in FIG. 9, which illustrates process 900. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 904, a user input is received at an actuation feature of a temperature device. For example and with reference to FIGS. 1 and 7B, a user input is received at the actuation feature 140. The button surface 143 may receive the user input via a contact from the forehead 204. The forehead 204 may be pressed against the button surface 143, depressing the button 142 in a direction into the housing 104. The button 142 may be depressed until the button surface 143 is substantially flush with the contact surface 105. The depression of the button 142 may cause the switch 148 to generate a signal indicative of the user input. The signal may be communicated to the sensing feature 120.

At operation 908, a temperature condition is detected using a contactless temperature sensor. For example and with reference to FIGS. 3 and 7B, the sensing feature 120 may receive one or more signals generated or initiated by the actuation feature 140. This may cause the sensing feature 120 to detect a temperature condition. For example, the sensing feature 120 includes the sensor 122 or other contactless temperature sensor. The sensor 122 may receive an infrared signal at the face 125 and generate information indicative of a temperature condition, based on the infrared signal.

At operation 912, information associated with the temperature condition is transmitted from the temperature device. The information may be transmitted from the temperature device to one or more devices of a network, including an authentication device. For example and with reference to FIGS. 3 and 6, Information associated with the temperature condition may be transmitted from the temperature device 100 to one or more devices of a network, including the authentication device 208. In some cases, the transmitted information may be associated with a febrile condition. For example and as described herein, one or more processing elements of the PCB 160 may be configured to determine a febrile condition using the detected temperature condition. In this regard, the temperature device 100 may communicate the determination of the febrile condition to another device. In other cases, another processing element, such as that associated with the authentication device or other device may be used to make the determination of the febrile condition.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A temperature device, comprising:
a housing having an exterior surface and defining an inner volume, a first hole, and a second hole, the first and second holes extending through the exterior surface at a common side of the housing and into the inner volume;
an actuation feature extending from the exterior surface and configured to receive a user input, wherein the actuation feature comprises:
a button protruding from the exterior surface of the housing and having a button surface configured to receive the user input, wherein the button is arranged at the second hole, and
a switch within the housing and configured for actuation by the button with the receipt of the user input;
a sensing feature coupled to the exterior surface adjacent the actuation feature and configured to detect a temperature condition in response to a receipt of the user input, wherein the sensing feature comprises a contactless temperature sensor arranged at the first hole; and
a communication module operatively connected to the sensing feature and configured to transmit and receive information associated with a detection of the temperature condition,
wherein:
the button surface is movable between an unactuated state and an actuated state in response to the receipt of the user input,
in the unactuated state, the button surface is proud relative to the exterior surface of the housing,
in the actuated state, the button surface is substantially flush with the exterior surface,
the button surface is configured to receive a contact from a forehead, and
the contactless temperature sensor is arranged within the housing such that, when the button surface is in the actuated state, the contactless temperature sensor is at a selected spacing from the forehead.

2. The temperature device of claim 1, wherein the contactless temperature sensor has a face configured to receive an infrared signal, the face being recessed from the exterior surface of the housing.

3. The temperature device of claim 1, wherein the communication module comprises a Bluetooth chip that transmits directional information regarding an orientation of the temperature device.

4. The temperature device of claim 1, wherein the housing is configured to fully enclose internal components of the temperature device, absent the actuation feature and the sensing feature.

5. A system, comprising:
a temperature device comprising:
a housing defining an exterior surface configured to contact a forehead, the exterior surface having a first hole and a second hole, a contactless temperature sensor arranged at the first hole and recessed from the exterior surface, the contactless temperature sensor configured to detect a temperature condition, the contactless temperature sensor comprising a face configured to receive infrared signals, and a button arranged at the second hole and protruding from the exterior surface, the button configured to receive a mechanical input, wherein:

a receipt of the mechanical input initiates a detection of the temperature condition using the sensor, the receipt of the mechanical input is configured to cause a depression of the button such that a button face is substantially flush with the exterior surface, and the face is recessed from an exterior surface of the housing and arranged to define a selected spacing from the forehead when the button is flush with the exterior surface;

an authentication device configured to generate user identification data; and a processing element in communication with the temperature device and the authentication device and configured to, in response to a detection of the temperature condition, associate the temperature condition with the user identification data generated by the authentication device.

6. The system of claim 5, wherein the user identification data is generated based on one or both of a facial image of a user of the temperature device or a user-identifying code.

7. The system of claim 6, wherein the processing element is further configured to verify the temperature condition as a temperature condition of the user based on information derived from at least one of the facial image or user-identifying code.

8. The system of claim 5, wherein the processing element is further configured to determine a vector between the temperature device and the authentication device.

* * * * *